UNITED STATES PATENT OFFICE

HARRY GOLDHAGEN, OF NEW YORK, AND OSCAR H. CORNELIUS, OF MASPETH, NEW YORK

PIPE JOINT COMPOUND

No Drawing. Application filed July 27, 1932. Serial No. 625,059.

The main object of this invention is to provide a compound to be used to provide a leak-proof sealing medium in pipe unions or joints, the compound when once properly applied to a union providing a permanently leak-proof connection.

Another object of the invention is the provision of such a compound in powdered form so that it will remain permanently stable before being used, and which further can be used at any time by the simple addition of water to the powder.

Still another object of the invention is the provision of such a compound which dispenses with the necessity of using lampwick or any other packing in the union, the compound when properly used without any other means providing the leak-proof joint which is desired. The compound embodied in this invention comprises the following ingredients in powdered form:

|  | Percent |
|---|---|
| Flour | 66 |
| Portland cement | 25 |
| Talcum | 3 |
| Lamp black | 3 |
| Sea sand | 3 |

In a modified form of the composition the sea sand may be omitted and 28% of Portland cement instead of 25% used. These various ingredients are thoroughly mixed so that the resultant composition is homogeneous. The composition may be packed and shipped in sealed containers such as tin cans, and when about to be used the amount required is removed from the container and mixed with water to form a plastic mixture of about the consistency of soft putty. This plastic mixture is applied to the male threads only of the pipe union. After the members of the union have been joined, the mixture dries and forms a leak-proof binder between the two members of the union.

This compound can be used on piping of all kinds such as iron, steel, brass, nickel, and so forth. The union containing this mixture will after it has set withstand enormous pressures without weakening.

We claim:

1. A pipe joint compound comprising flour, Portland cement, lamp black, talcum, and sea sand.

2. A pipe joint compound comprising flour, Portland cement, lamp black, talcum, and sea sand, each of said ingredients being in powdered form.

3. A pipe joint compound comprising flour, Portland cement, lamp black, talcum, and sea sand, each of said ingredients being in powdered form and being thoroughly mixed together to form a homogeneous mass, and water being mixed with said mass to form a plastic mixture of the consistency of soft putty when said compound is about to be used.

4. A pipe joint compound comprising approximately 60% of flour, 25% of Portland cement, 3% of lamp black, 3% of talcum, and 3% of sea sand.

In testimony whereof we affix our signatures.

HARRY GOLDHAGEN.
OSCAR H. CORNELIUS.